United States Patent [19]
Pollack

[11] Patent Number: 5,214,265
[45] Date of Patent: May 25, 1993

[54] HIGH SPEED LOW DEPOSITION SUBMERGED ARC WELDING APPARATUS AND METHOD

[76] Inventor: Alex J. Pollack, 8703 Surf Dr., Panama City, Fla. 32408

[21] Appl. No.: 874,054

[22] Filed: Apr. 24, 1992

Related U.S. Application Data

[63] Continuation-in-part of Ser. No. 613,608, Nov. 15, 1990, Pat. No. 5,140,140.

[51] Int. Cl.[5] .................................. B23K 9/18
[52] U.S. Cl. ............................. 219/137 PS; 219/61; 219/73; 219/130.1
[58] Field of Search ......... 219/72, 73, 137 R, 137 PS, 219/61, 130.1

[56] References Cited

U.S. PATENT DOCUMENTS 4,442,340  4/1984  Kawabata et al. ............ 219/137 PS

FOREIGN PATENT DOCUMENTS 56-4374  1/1981  Japan ............................. 219/72

Primary Examiner—Clifford C. Shaw
Attorney, Agent, or Firm—Steven C. Stewart

[57] ABSTRACT

A method and apparatus for submerged arc welding with four electrodes positioned along a line from front to rear. The first of the electrodes is supplied with direct current, and the remaining three electrodes are supplied with alternating current. The direct current electrode generate an arc that penetrates the base metal and initiates a weld. The other electrodes are supplied with alternating current having a 90°±15° current separation between the leading and trailing AC electrodes, and the trailing and middle AC electrodes. Alternating current is supplied between electrodes the trailing and middle AC electrode, having a 180°±30° current separation. The AC electrodes combine to generate an arc that deposits a filler and shapes the weld.

10 Claims, 2 Drawing Sheets

HIGH SPEED LOW DEPOSITION SUBMERGED ARC WELDING APPARATUS AND METHOD

This application is a continuation-in-part of U.S. patent application Ser. No. 07/613,608 filed Nov. 15, 1990, now U.S. Pat. No. 5,140,140.

BACKGROUND OF THE INVENTION

This invention relates to a method for submerged arc welding, and more particularly a four electrode welding process used for manufacture of light-wall steel pipe.

Large diameter steel pipes are typically formed by shaping a metal sheet into an O-shaped cross section by various mechanical means. Once shaped it is necessary to weld the seam along the edges of the sheet to seal the pipe. One method that has been widely used is the submerged arc welding process.

To improve production efficiency of the welding process, it is necessary to increase the welding speed. Once method of increasing the welding speed is the utilization of multiple electrodes. Methods have been developed utilizing multiple electrodes in arrangements of three, four, five, and more electrodes. Welding processes using three electrodes are disclosed in U.S. Pat. No. 2,436,387, U.S. Pat. No. 3,336,460 and U.S. Pat. No. 3,456,089. A welding process using four electrodes is disclosed in U.S. Pat. No. 4,442,340.

The welding speeds obtained with these processes are not efficient enough to meet current demands. Processes with five or more electrodes have very high deposition rates which lead to excessive weld reinforcement on light-wall pipe above 3.2 mm which is not allowable by most pipe specifications. In addition, excessive deposition does not add to the structural integrity of the product and wastes material. Another drawback to processes with five or more electrodes being used on light-wall material, is a high heat input which leads to melt through of the pipe.

There are many factors which limit the welding speed, the main factors are assurance of sufficient penetration depth and avoidance of welding defects. The most common type of welding defect associated with high welding speeds is undercutting. Undercutting is an unfilled area at the toe of the weld created by various sources including lack of filler material, adverse electromagnetic forces between arcs, and in general an unstable weld puddle. Undercutting is usually corrected by increasing the rate of weld deposition or by slowing the weld speed.

The two most common methods for increasing the deposition rate are increasing the input current to the electrodes and increasing the number of electrodes. The input current can be increased to only a certain threshold in multi-electrode welding. Above this threshold adverse electromagnetic interaction between the electrodes occurs. The higher the current input, the stronger the magnetic field interaction between the electrodes.

Significantly varying field interaction results in weld puddle instability. Thus, adding more electrodes would also increase the probability of adverse electromagnetic interference.

The goal therefore set forth is a welding process that provides increased welding speed, good weld puddle stability, beneficial rather than adverse electromagnetic interaction, good penetration capabilities, a limited number of electrodes, and capability of utilization on light wall metal material.

A process that has attempted to increase the efficiency of welding pipe is a four electrode submerged arc welding process disclosed in U.S. Pat. No. 4,442,340. This process increases the welding speed by applying alternating current to all four electrodes. Although this process displays improvement over previous art, it does not supply sufficient penetration capabilities at the higher speeds now required. One factor reducing the penetration capability of that the aforementioned patent is that it uses alternating current for the lead electrode which can not deliver the heat input efficiently enough to achieve the required penetration of the weld at the higher speeds demanded.

Increasing the current on the electrodes increases penetration. However increased current increases the rate of weld metal deposition. Further the increase in current required to obtain penetration is disproportional to the allowable increase in welding speed, consequently more deposition per linear length is deposited. Thus increasing linear weld deposition results in excessive weld reinforcement which is unallowable by most tubular product codes and specifications.

Another drawback to welding with increased current levels is an increased electromagnetic interaction between electrodes. When the electromagnetic fields between electrodes increase beyond a threshold point, the weld puddle becomes unstable resulting in undercutting.

SUMMARY OF THE INVENTION

It is an object of this invention to provide an improved submerged arc welding process using four electrodes in a common pool of weld metal.

It is another object of this invention to submerge arc weld light-wall material (thickness $\leq 0.50''$) while preventing or suppressing weld discontinuities at high welding speeds without any degradation in the quality of the weld.

It is a further an object of this invention to provide a four electrode system that uses a single DC electrode followed by three AC electrodes in line which are electromagnetically balanced and provide a stable weld puddle.

It is a further an object of this invention to use a sole DC electrode primarily for the function of penetrating the base metal, initiating a weld while using three alternating current electrodes principally for the filling and shaping of the weld.

Another object of this invention is to arc weld by connecting direct current to one electrode and alternating current to the other electrodes to principally separate the electrodes penetration and filling functions to achieve an efficient process capable of increased travel speeds, while minimizing excess deposition which makes the final product unacceptable.

It is also an object of this invention to weld with a direct current electrode in combination with three electromagnetically stable alternating current electrodes to obtain welding speeds exceeding 130 inches per minute on light-wall material.

Also an object of the invention is to submerge arc weld a pipe with an electrode supplied with direct current in line with three electrodes supplied with alternating current having a phase difference of $180°\pm30°$ between AC electrode 1 and 2; and a $90°\pm15°$ phase difference between the AC electrode 2 and 3, and AC electrode 1 and 3.

It is also an object of this invention to operate four electrodes, one with direct current, and the other three electrodes with alternating current where the power supplied to the direct current electrode is adjusted to obtain penetration of the base metal to any depth and the power supplied to the other three alternating current electrodes is set to obtain the exact level of deposition required while reducing excess weld reinforcement.

It is an object of this invention to operate four electrodes with sufficient current for arc stability, with the capability of welding on light-wall material 0.200–0.562 inches thick.

An additional object of this invention is to achieve welding speeds greater than 130 inches per minute (ipm) on light-wall material while producing weld reinforcement less than 3.2 mm in height.

These and other objects are provided with a method of arc welding a base metal with four electrodes comprising the steps of aligning the electrodes $E_{DC}$, $E_{AC1}$, $E_{AC2}$, $E_{AC3}$ in one row from front to rear in a welding direction. The electrode $E_{DC}$ is supplied with direct current and electrodes $E_{AC1}$, $E_{AC2}$ and $E_{AC3}$ are supplied with alternating current having a phase separation of $180° \pm 30°$ between electrodes $E_{AC1}$ and $E_{AC2}$, and having a phase separation of $90° \pm 15°$ between electrodes $E_{AC2}$ and $E_{AC3}$, and $E_{AC3}$ and $E_{AC1}$. The power is supplied to the electrodes so that the arc from the $E_{DC}$ primarily penetrates the base metal initiating a weld while the arcs from the other electrodes mainly achieve the required deposition without exceeding weld reinforcement limitation.

The above objects may also be achieved with an apparatus for submerged arc welding a base metal comprising a plurality of arc welding electrodes positioned in a row from front to rear in a welding direction. The apparatus supplies one of the electrodes with a direct current so that an arc is generated that melts and penetrates the base metal. The apparatus also supplies the other electrodes with alternating current so that an arc is generated that deposits a filler and shapes the weld.

DESCRIPTION OF THE PREFERRED EMBODIMENTS

Figure 1:
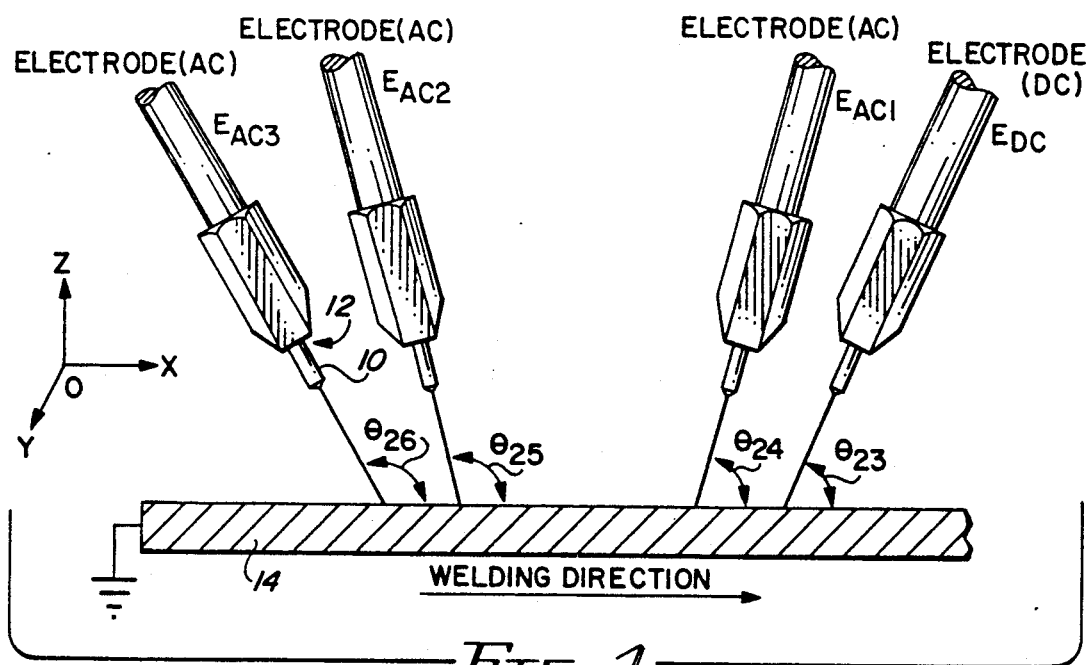
FIG. 1 is a side view of an electrode arrangement for a four electrode high speed, low deposition submerged arc welding process.

Referring to FIG. 1 there are shown four electrodes $E_{DC}$, $E_{AC1}$, $E_{AC2}$, and $E_{AC3}$ that are used in the submerged arc welding process. These electrodes include welding wire 10 in opposition to base metal 14. The lead electrode $E_{DC}$ is provided with direct current (DC) through a welding wire 10 and mainly performs the function of penetrating the base metal to initiate a weld. The remaining electrodes $E_{AC1}$, $E_{AC2}$ and $E_{AC3}$ are provided with alternating currents (AC) through a welding 10 to achieve the required fill of the weld and perform the bead shaping functions on base metal 14.

It is recognized by the inventor that the highest weld stability is achieved by the separation of the penetration function performed by $E_{DC}$, from the filling and forming function of $E_{DC1}$, $E_{AC1}$, $E_{AC2}$, and $E_{AC3}$. This stability allows speeds equal to that of five or more electrodes, but with substantially lower deposition rates over the prior art. The arc from the DC electrode and the AC electrodes all share a common pool of weld metal. Although the arcs are contained in a common pool, each of the wires coupled to the electrodes are individually fed with separate controls.

Electrodes $E_{AC1}$, $E_{AC2}$, AND $E_{AC3}$ may be connected in many current phase relationships, to provide different operating characteristics during submerged arc welding. Numerous relationships were tested as shown in the following Example 1:

Example 1

Various phasing arrangements were tested to determine which arrangement provided the highest welding speed and still maintain stability of the weld. These electrode arrangements were tested using the parameters listed in Table B with a 0.500 inch thick metal base using a magnesium oxide based flux. The phasing arrangements tested with their respective Maximum obtainable welding speeds without demonstrating undercutting are listed below in Table A.

TABLE A

| | Electrodes Phase Relationship (°) | | Max. Welding Speed (in/min) |
|---|---|---|---|
| $E_{AC1}$ to $E_{AC2}$ | $E_{AC2}$ $E_{AC3}$ | $E_{AC3}$ to $E_{AC1}$ | |
| 90 | 270 | 0 | 105 |
| 90 | 90 | 180 | 102 |
| 0 | 270 | 90 | 110 |
| 90 | 180 | 90 | 95 |
| 180 | 90 | 90 | 136 |
| 120 | 120 | 120 | 90 |

TABLE B

Four Electrode High Speed, Low Deposition Welding Condition

| Electrode | Current (A) | Voltage (V) | Inclination of Electrode $\phi(°)$ | Distance between Electrode (mm) | Welding Speed (in/Min) | Thermal Input for Weld (KJ/in) |
|---|---|---|---|---|---|---|
| $E_{DC}$ (DC) | 1750 | 33 | 75 ($\phi_{23}$) | 20 | 136 | 64 |
| $E_{AC1}$ (AC) | 900 | 35 | 83 ($\phi_{24}$) | 25 | | |
| $E_{AC2}$ (AC) | 750 | 37 | 90 ($\phi_{25}$) | 25 | | |
| $E_{AC3}$ (AC) | 720 | 40 | 115 ($\phi_{26}$) | | | |

Figure 2:
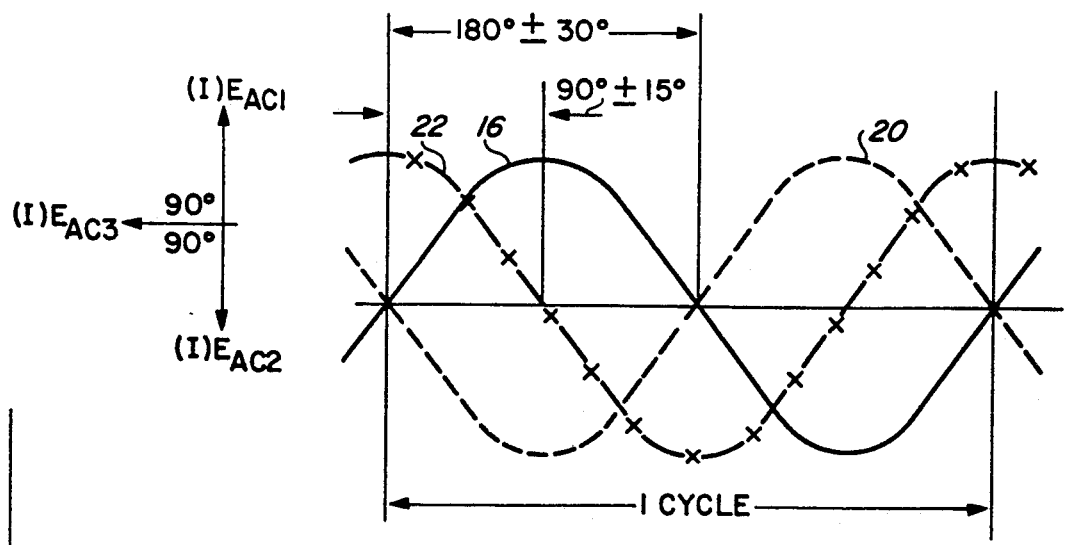
FIG. 2 is a plot of the preferred phase relationship for the three alternating current electrodes used in the welding process according to the invention.

As found in the aforementioned tests, optimum stability was obtained with the electrodes $E_{AC1}$ and $E_{AC2}$ in a $180° \pm 30°$ phase relationship, $E_{AC2}$ and $E_{AC3}$ in a $90° \pm 15°$ phase relationship, and $E_{AC3}$ and $E_{AC1}$ in a $90° \pm 15°$ phase relationship. A plot of this relationship is shown in FIG. 2. The welding process using this relationship will be referred to as the four electrode High Speed Low Deposition (HSLD) system herein.

It is recognized that with this phasing relationship in the HSLD system, the electromagnetic field relationship between the electrodes promotes weld puddle stability greater than prior four electrode welding processes. Due to the higher weld puddle stability, over supply of weld metal is not required, for the purpose of suppressing undercuts. Therefore lower levels of deposition can be achieved at higher speeds than which were recognizable with prior art.

Referring to FIG. 2, there is shown a plot of the phasing relationships between the AC electrodes in HSLD system. Sine wave 16 corresponds to a sample sine wave of electrode $E_{AC1}$, sine waves 18 and 20 correspond to sine waves of electrodes $E_{AC2}$ and $E_{AC3}$ respectively. It is recognized that by phasing being provided between electrodes $E_{AC1}$ and $E_{AC2}$ at 180°±30°; and $E_{AC2}$ and $E_{AC3}$ at 90°±15° that the magnetic effects between electrodes are significantly reduced. It is also recognized that higher external magnetic fields direct arcs from the electrodes toward the weld pool center, which increases the puddle stability and suppresses undercutting. Due to the 90°±15° phase relationships between $E_{AC2}$ and $E_{AC3}$ that favorable electromagnetic interaction occurs between the electrodes widening the weld cap and thus reducing the height of weld reinforcement.

Three parameters in the setup of the electrodes are critical. The first is the spacing between the electrodes, the second is the phase relationship between the alternating current electrodes, and the third is the intensity of the power applied to each electrode. If any of the three parameters are excessive, an undesirable magnetic interaction occurs, generally referred to as arc blow.

Arc blow is prevented by maintaining the proper spacing between electrodes. As electrode spacing decreases, electromagnetic interaction increases. As electrode space increases heat input efficiency decreases, reducing possible travel speeds of the electrodes. Preferably the electrodes are spaced apart at a distance of between 20 to 25 millimeters when the electrode stickout is approximately 1 inch.

The preferred phase relationship between the two trailing electrodes is 90°±15° to prevent arc blow. It has been found that this phase relationship provides a high level of field cancellation between the two trailing electrodes thus increasing weld puddle stability.

Figure 3:
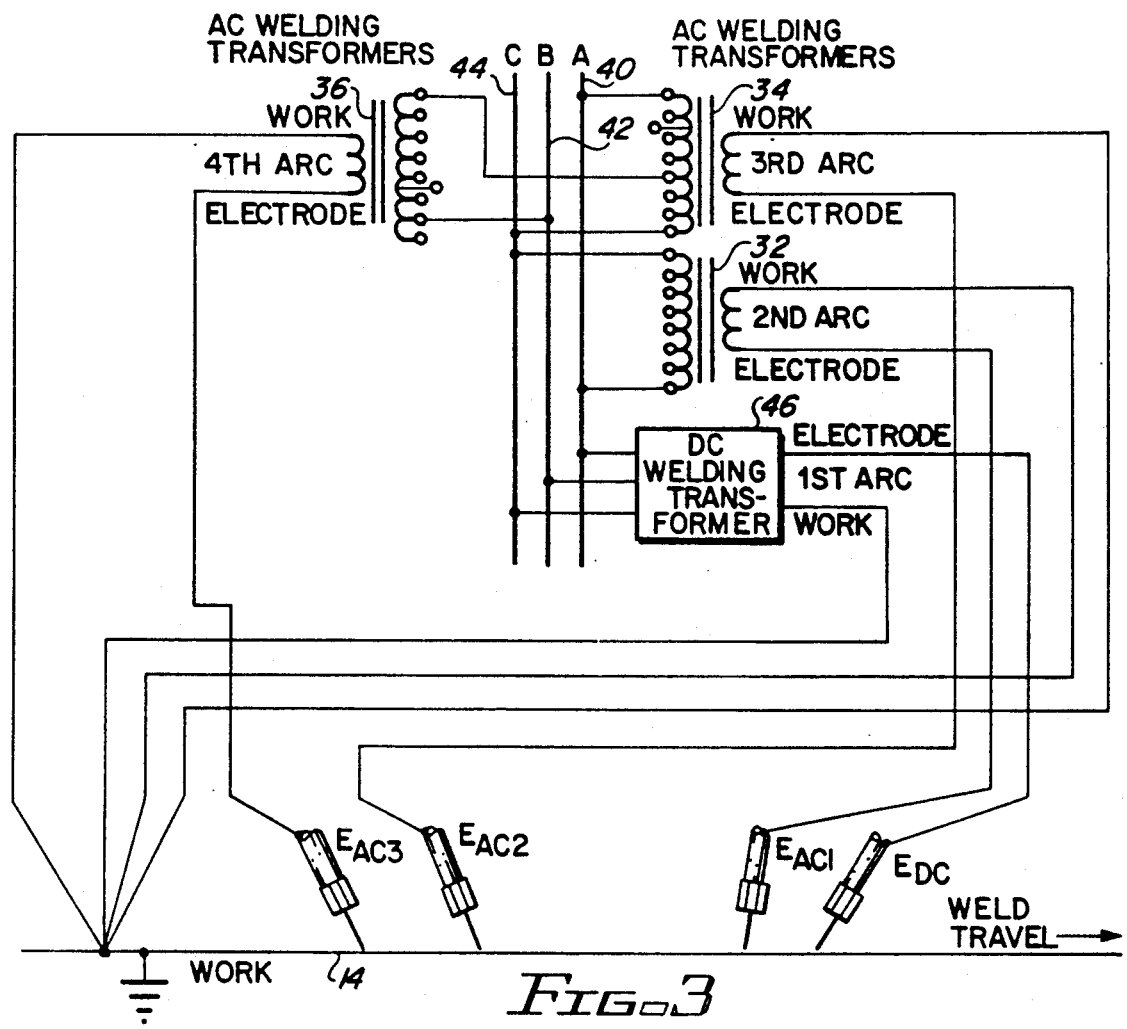
FIG. 3 is a schematic diagram of the welding process using a three phase power source connection.

Referring to FIG. 3, there is shown the wiring connections for the four electrode HSLD system to maintain a 180° phase relationship between $E_{AC1}$ and $E_{AC2}$, and a 90° phase relationship between $E_{AC2}$ and $E_{AC3}$. Electrodes $E_{AC1}$, $E_{AC2}$, and $E_{AC3}$ are coupled to transformers 32, 34 and 36 respectively, and to three phase alternating current lines 40, 42 and 44. Electrode $E_{DC}$ is coupled to DC welder transformer 46. This DC transformer 46 is also coupled to three power lines 40-44.

Each of electrodes $E_{DC}$, $E_{AC1}$, $E_{AC2}$, and $E_{AC3}$ are grounded through transformers 32, 34 and 36 to base metal 14. DC transformer 46 is also grounded to base metal 14. Transformers 46, 32, 34 and 36 and electrodes $E_{DC}$, $E_{AC1}$, $E_{AC2}$, and $E_{AC3}$ are constructed by conventional means. Exemplary transformers and electrodes are made by L-Tec, Inc. of Ashtabula, Ohio.

Referring to FIG. 1, the electrodes are inclined to aim arcs toward the center of the weld pool. Exemplary configuration of the electrodes are described in the following examples.

EXAMPLE 2

Submerged arc welding was tested using the parameters in Table B for the four electrode process and the following Table C for a five electrode welding process. These tests were conducted using a base metal having a 0.375 inch thickness and a 0.500 inch thickness. The results of these tests as well as the four electrode welding process described in U.S. Pat. No. 4,442,340 are shown in the following Table D.

TABLE C

| | Five-Electrode Welding Condition and Arrangement Used for Testing | | | | | |
|---|---|---|---|---|---|---|
| Electrode | Current (A) | Voltage (V) | Inclination of Electrode Phi (°) | Distance between Electrode (mm) | Welding Speed (in/Min) | Thermal Input for Weld (KJ/in) |
| $E_{DC}$ (DC) | 1600 | 32 | 75 | 20 | 125 | 74 |
| $E_{AC1}$ (AC) | 750 | 34 | 83 | 25 | | |
| $E_{AC2}$ (AC) | 700 | 37 | 90 | 25 | | |
| $E_{AC3}$ (AC) | 650 | 37 | 100 | 25 | | |
| $E_{AC4}$ (AC) | 650 | 40 | 125 | | | |

In this five wire test, the first electrode $E_{DC}$ is supplied with DC current. The other electrodes are supplied with AC current at a phase relationship where a 90°±15° separation is maintained between adjacent electrodes and 180°±30° between alternate electrodes. Exemplary wire connections of how to obtain these phasing angles is disclosed in U.S. patent application Ser. No. 613,608 filed Nov. 15, 1990 which is hereby incorporated by reference.

TABLE D

| | Welding Speed and Heat Input Comparison of Four Electrode HSLD System with Five Electrode and Prior Art Four Electrode Welding Processes | | | | | |
|---|---|---|---|---|---|---|
| Thickness | Four Electrode HSLD | | '340 Process | | Five Electrode Process | |
| Base Metal (inches) | Welding Speed (in/min) | Heat Input (Kjoules/in) | Welding Speed (in/min) | Heat Input (Kjoules/in) | Welding Speed (in/min) | Heat Input (Kjoules/in) |
| .375 | 136 | 62 | 102 | 102 | 132 | 66 |
| .500 | 136 | 64 | 100 | 91 | 125 | 74 |

It is recognized that a minimum of 33% increase in welding speed is obtained over the prior four-electrode system tested, a 3% increase is obtained over the tested five-electrode system, and a 38% increase over prior three electrode systems. It is further realized that a minimum of 29% reduction of heat input is achieved over the prior four-electrode system, and a minimum of 6% reduction of heat input is achieved compared to the five-electrode system tested. The reduction of heat input increases the toughness of the weld.

A comparison of weld deposition is described in the following Table E. This table shows that a 25% reduction in deposition per foot is achieved over the prior four electrode system and a 12% reduction in deposition compared to the five-electrode system.

TABLE E

Deposition Comparison of Four Electrode HSLD welding process with Four and Five Electrode Welding Process

| | Four Electrode HSLD | '340 Process | Five Electrode Process |
| --- | --- | --- | --- |
| Deposition Rate (lbs/min) | 2.38 | 2.40 | 2.49 |
| Welding Speed (in/min) | 136 | 102 | 125 |
| Deposition (lbs/foot) | .210 | .282 | .239 |

Although less linear deposition is achieved with prior art three electrode systems than four electrode HSLD systems, both systems provide welds which are well within the allowable limit of weld reinforcement. The significant gain in welding speed (approximately 38%) more than justifies the change to the four electrode HSLD system.

EXAMPLE 3

Figure 4:
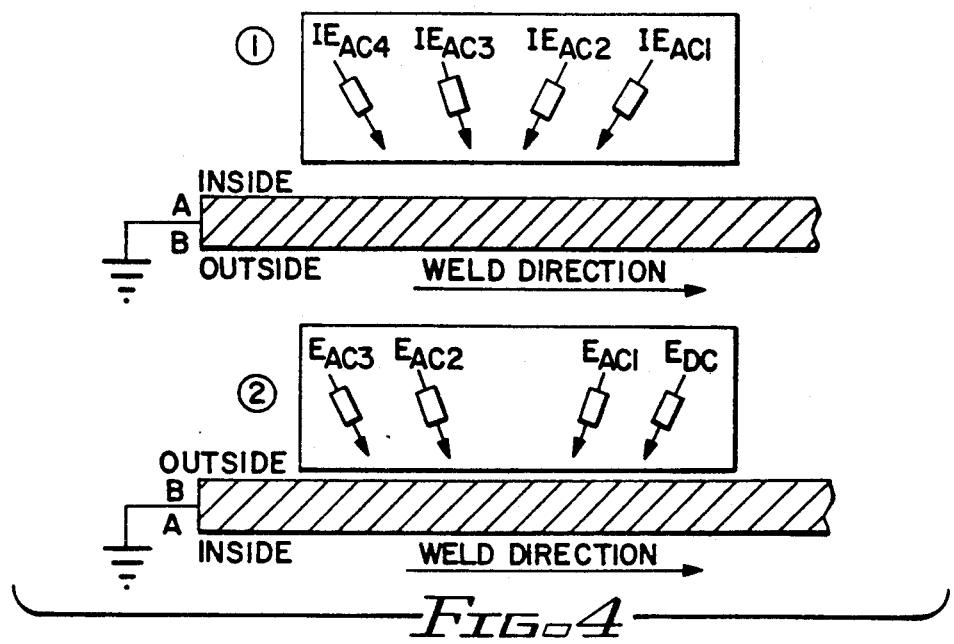
FIG. 4 illustrates a method of welding the inside and outside of a pipe in accordance with the invention.

The following is an exemplary process for welding metal pipes with thin wall as illustrated in FIG. 4. The steps for this process are as follows:

First, a base metal is formed into an "O" shape using known mechanical processes. After being formed, the edges of the base metal are placed adjacent each other to form a seam. The inside seam of the pipe is welded using four electrodes $IE_{AC1}$, $IE_{AC2}$, $IE_{AC3}$ and $IE_{AC4}$ (FIG. 4) which are supplied with AC power while moving along the pipe. As the pipe seam is not reinforced and has no backing mechanism, it is not necessary to penetrate deeply with the arc from the electrodes as with $E_{DC}$. The electrodes $IE_{AC1}$, $IE_{AC2}$, $IE_{AC3}$, and $IE_{AC4}$ are configured with the parameters set forth in the following Table F below with a travel speed of 95 inches per minute for a pipe having a 0.500 inch thickness. The adjacent electrodes $IE_{AC1}-IE_{AC4}$ are supplied with AC having a phase separation of 90°±15° while alternating electrodes $IE_{AC1}$ and $IE_{AC3}$, $IE_{AC2}$ and $IE_{AC4}$ are supplied with AC having a phase separation of 180°±30°. Although 95 inches per minute is specified, this travel speed is limited by the speed at which the pipe may be moved and not the speed at which the pipe could be welded. The electrodes are then moved along the inside seam of the pipe to shape and fill the weld.

TABLE F

Four-Electrode Welding Condition and Arrangement Used for Testing

| Electrode | Current (A) | Voltage (V) | Inclination of Electrode $\phi(°)$ | Distance Between Electrode (mm) |
| --- | --- | --- | --- | --- |
| $IE_{AC1}$ (AC) | 750 | 34 | 83 | 25 |
| $IE_{AC2}$ (AC) | 700 | 37 | 90 | 25 |
| $IE_{AC3}$ (AC) | 650 | 39 | 100 | 25 |
| $IE_{AC4}$ (AC) | 650 | 40 | 125 | |

After inside welding, the pipe is welded on the outside seam. The four electrode HSLD system as previously described, is then supplied AC and DC power. The four electrodes are moved along the seam on the outside of the pipe at 136 inches per minute to complete the welding process. The arc from the lead electrode $E_{DC}$ penetrates the pipe and the inside weld of the seam to provide an overlapping 100% penetration weld. The arcs produced by the alternating current electrodes $E_{AC1}$, $E_{AC2}$ and $E_{AC3}$ primarily provide the remaining necessary deposition to fill and shape the weld.

As can be seen from the above description, the four electrode HSLD system improves the welding efficiency without adversely affecting the weld quality. These advantages are accomplished by employing suitable connections to the four-electrodes with both direct and alternating current sources. These connections achieve remarkable improvements at the welding speeds specified while maintaining weld quality.

This concludes the description of the preferred embodiments. A reading by those skilled in the art will bring to mind various changes without departing from the spirit and scope of the invention. It is intended, however, that the invention only be limited by the following appended claims.

What is claimed is:

1. A method of arc welding a base metal with electrodes, the method comprising the steps of:
   providing electrodes $E_{DC}$, $E_{AC1}$, $E_{AC2}$, and $E_{AC3}$;
   aligning the electrodes $E_{DC}$, $E_{AC1}$, $E_{AC2}$, and $E_{AC3}$ in a row from front to rear in a welding direction;
   supplying electrode $E_{DC}$ with direct current;
   supplying electrodes $E_{AC1}$, $E_{AC2}$, and $E_{AC3}$ with alternating current having a phase angle;
   maintaining a difference in the phase angle of the alternating current supplied to electrodes $E_{AC2}$ and $E_{AC3}$, and to electrodes $E_{AC3}$ and $E_{AC1}$ at 90°±15°;
   maintaining a difference in the phase angle of the alternating current supplied to electrodes $E_{AC1}$ and $E_{AC2}$ at 180°±30°;
   generating an arc with electrode $E_{DC}$, when direct current is supplied, that penetrates the base metal and initiates a weld; and
   generating an arc with electrodes $E_{AC1}$, $E_{AC2}$, and $E_{AC3}$, when alternating current is supplied, that primarily achieves the required deposit and shapes the weld.

2. The method as recited in claim 1 further comprising the steps of inclining electrodes $E_{DC}$, $E_{AC1}$, $E_{AC2}$, and $E_{AC3}$ at about 75°, 83°, 90°, 125° respectively while generating an arc.

3. The method as recited in claim 1 further comprising the step of maintaining a distance between the electrode from about 20 mm to 25 mm.

4. The method as recited in claim 1 further comprising the steps of applying 1750 amps of direct current to $E_{DC}$, 900 amps of alternating current to $E_{AC1}$, 750 amps of alternating current to $E_{AC2}$, and 720 amps of alternating current to $E_{AC3}$.

5. An apparatus for submerged arc welding a base metal comprising:
   a plurality of arc welding electrodes $E_{DC}$, $E_{AC1}$, $E_{AC2}$, and $E_{AC3}$ positioned in a row from front to rear in a welding direction;
   a source of direct current supplying electrode $E_{DC}$ with a direct current to generate an arc that penetrates the base metal and initiates a weld; and
   a source of alternating current supplying electrodes $E_{AC1}$, $E_{AC2}$, and $E_{AC3}$ with alternating current having a $90°\pm15°$ current separation between electrodes $E_{AC2}$ and $E_{AC3}$, and electrodes $E_{AC3}$ and $E_{AC1}$, and said source of alternating current supplying current between electrodes $E_{AC1}$ and $E_{AC2}$, having a $180°\pm30°$ current separation, said electrodes $E_{AC1}$, $E_{AC2}$, and $E_{AC3}$ being positioned adjacent the base metal to generate an arc that deposits a filler and shapes the weld.

6. The apparatus as recited in claim 5 further comprising means for inclining electrodes $E_{DC}$, $E_{AC1}$, $E_{AC2}$, and $E_{AC3}$ at about 75°, 83°, 90°, 120° respectively while the arc is being generated.

7. The method as recited in claim 5 wherein the distance between the electrodes is maintained from about 20 mm to 25 mm.

8. The method as recited in claim 5 further comprising means for applying 1750 amps of direct current to $E_{DC}$, 900 amps of alternating current to $E_{AC1}$, 750 amps of alternating current to $E_{AC2}$, and 720 amps of alternating current to $E_{AC3}$.

9. A method of arc welding the seam of a metal pipe comprising the steps of:
   aligning electrodes $E_{DC}$, $E_{AC1}$, $E_{AC2}$, and $E_{AC3}$ in a row from front to rear in the welding direction;
   positioning the electrodes $E_{DC}$, $E_{AC1}$, $E_{AC2}$, and $E_{AC3}$ adjacent the seam on the outside surface of the metal pipe;
   supplying electrode $E_{DC}$ with direct current to penetrate the metal pipe;
   supplying electrodes $E_{AC1}$, $E_{AC2}$, and $E_{AC3}$ with alternating current having a phase angle;
   maintaining a difference in the phase angle of the alternating current supplied to electrodes $E_{AC2}$ and $E_{AC3}$, and to electrodes $E_{AC3}$ and $E_{AC1}$ at $90°\pm15°$;
   maintaining a difference in the phase angle of the alternating current supplied to electrodes $E_{AC1}$ and $E_{AC2}$ at $180°\pm30°$;
   moving electrodes $E_{DC}$, $E_{AC1}$, $E_{AC2}$, and $E_{AC3}$ along the outside seam of the pipe in the welding direction while supplying direct current to electrode EDC and alternating current to electrodes $E_{AC1}$, $E_{AC2}$, and $E_{AC3}$ to weld the seam together;
   aligning four electrodes $IE_{AC1}$, $IE_{AC2}$, $IE_{AC3}$ and $IE_{AC4}$ in a row from front to rear in a welding direction;
   positioning said electrodes $IE_{AC1}$, $IE_{AC2}$, $IE_{AC3}$, and $IE_{AC4}$ adjacent the seam on the inside surface of the metal pipe;
   moving electrodes $IE_{AC1}$, $IE_{AC2}$, $IE_{AC3}$ and $IE_{AC4}$ along the inside seam of the pipe in the welding direction prior to electrodes $E_{DC}$, $E_{AC1}$ $E_{AC2}$, and $E_{AC3}$ welding the outside seam together and
   supplying electrodes $IE_{AC1}$, $IE_{AC2}$, $IE_{AC3}$, and $IE_{AC4}$ with alternating current with a $90°\pm15°$ current separation between adjacent electrodes and $180°\pm30°$ between alternating electrodes while moving electrodes $IE_{AC1}$, $IE_{AC2}$, $IE_{AC3}$, and $IE_{AC4}$ along the inside seam of the pipe.

10. The method as recited in claim 9 further comprising the steps of:
    generating an arc with electrode $E_{DC}$, when direct current is supplied, that penetrates the base metal and initiates a weld; and
    generating an arc with electrodes $E_{AC1}$, $E_{AC2}$, and $E_{AC3}$, when alternating current is supplied, to achieve the required deposit and shape the weld.

* * * * *